(12) United States Patent
Almenar Belenguer et al.

(10) Patent No.: US 9,084,138 B2
(45) Date of Patent: Jul. 14, 2015

(54) METHOD FOR TERMINATING VOICE CALLS IN A WIRELESS COMMUNICATION NETWORK

(71) Applicant: Vodafone IP Licensing Limited, Newbury Berkshire (GB)

(72) Inventors: Pedro Almenar Belenguer, Madrid (ES); Juan Antonio Martin, Madrid (ES); Jose Luis Tejedor, Madrid (ES); Pedro Alverez-Tabio, Madrid (ES); Luis Carlos Sernandez, Madrid (ES); Miguel De Castro, Madrid (ES); Javier Leopoldo Fernandez, Madrid (ES); Ana Zurbano, Madrid (ES); Catalina Olmo, Madrid (ES)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 13/869,356

(22) Filed: Apr. 24, 2013

(65) Prior Publication Data

US 2014/0254375 A1    Sep. 11, 2014

(30) Foreign Application Priority Data

Apr. 24, 2012 (ES) .................................. 201230606

(51) Int. Cl.
*H04W 28/02* (2009.01)
*H04W 8/12* (2009.01)
*H04L 29/08* (2006.01)

(52) U.S. Cl.
CPC ........... *H04W 28/0289* (2013.01); *H04L 29/08* (2013.01); *H04W 8/12* (2013.01)

(58) Field of Classification Search
CPC ..... H04W 28/0289; H04W 8/12; H04L 29/08
USPC .......................... 370/235, 231, 312, 352–356
See application file for complete search history.

(56) References Cited

U.S. PATENT DOCUMENTS

| 7,787,858 B2 * | 8/2010 | Koskinen et al. ............. 455/405 |
| 7,881,288 B2 * | 2/2011 | Noldus et al. ................. 370/354 |
| 2012/0083265 A1 * | 4/2012 | Noldus ....................... 455/426.1 |

FOREIGN PATENT DOCUMENTS

| EP | 2 134 101 | 12/2009 |
| WO | WO 2010/145707 | 12/2010 |
| WO | WO 2011/072747 | 6/2011 |

OTHER PUBLICATIONS

Spanish Search Report for corresponding application No. 201230606 mailed Mar. 4, 2014.

\* cited by examiner

*Primary Examiner* — Mohammad Anwar
(74) *Attorney, Agent, or Firm* — B. Aaron Schulman, Esq.; Nicholas Trenkle; Stites & Harbison, PLLC

(57) ABSTRACT

A method to reduce signalling loads in wireless communication networks in a wireless communication network comprising an IMS (IP Multimedia Subsystem) application server allocated on a server by implementing a new voice call terminating procedure. The method comprises determining whether a Mobile Station Roaming Number (MSRN) is related to a foreign network and, based on this determination, performing a number of operations.

7 Claims, No Drawings

METHOD FOR TERMINATING VOICE CALLS IN A WIRELESS COMMUNICATION NETWORK

This application claims benefit of Ser. No. 201230606, filed Apr. 24, 2012 in Spain and which application is incorporated herein by reference. To the extent appropriate, a claim of priority is made to each of the above disclosed application.

FIELD OF THE INVENTION

The invention relates to communication, and more specifically to a wireless communication system.

The object of the invention is to provide a procedure for reducing loads in wireless communications networks by managing how voice calls are directed and terminated, the method hereby described is especially suitable for those users establishing voice calls when they are on roaming.

BACKGROUND

One of the biggest benefits IMS has brought into the mobile networks is the ability to orchestrate multiple terminating voice services, which traditional IN does not allow to. In this scenario, besides IMS executing any terminating services it is necessary to determine, for each call, if the user is roaming abroad so as to charge him properly (regardless of his prepay/post pay character) and apply FreeDivertToVoiceMail service, if required. Solutions to do so fall in 2 categories:

They either use an IN service which is triggered in the circuit network, receives location information and charges & applies FreeDivertToVoiceMail, if the user is abroad, before relaying the call to IMS. This solution does not work properly if any later terminating service modifies the destination of the call; or they use an IMS application server which is triggered as the last IMS service for each call and sends an Any Time Interrogation (ATI) MAP operation to determine the location of the user. This generates a lot of useless ATI traffic since in most cases the user will not be roaming so that the location information will not be needed.

Right now voice calls flows are as follows:

A voice associated to a User Equipment (UE) is described; said User Equipment (UE) is a client of a wireless Communications network. So the flow of a normal operation of a voice service is:

the client dials a destination number establishing a voice call, using the UE, the voice call is managed by the ISUP reaching a MSS (MSC Server) that triggers a petition of MAP SendRouting Information to the HLR of the destination, namely a destination client, the HLR returns as response to the SendRoutingInformation a terminating mark of service of IN associated to said client, the MSS, according said mark, routes the call to an IMS network using an -INVITE-SIP message, an EI I-CSCF, first node of the IMS network consults the HSSS and then routes the INVITE to the S-CSCF, after receiving the INVITE message, the S-CSCF downloads a user profile corresponding to the client from the HSS and triggers at least one service previously defined in said HSS (said triggering mainly consists of sending INIVITEs to one or more application servers defined in the user profile of the HSS, after executing a last service associated to the user profile, if the destination has not changed, said destination is amended by adding a prefix no the client number so the CSCF, after asking the ENUM, may send it to the Circuit Switch network, to a MSS, adding and indication saying that the call does not require terminating services.

after receiving the INVITE, the MSS, sends a MAP SendRoutingInformation petition to the destination client's HLR including a mark of withdrawal of terminating intelligent network services or mark of withdrawal of services, the HLR, once detected the mark of withdrawal of services, triggers a normal procedure of collection of a Mobile Station Roaming Number (MSRN), interacting with a Visitor Location Register (VLR) where the client UE is allocated and returning said MSRN to the calling MSS in the response to the SendRoutingInformation, The MSS routes the call to the MSRN La MSS using the usual procedures established by the ISUP/SS7.

Seeing the above posed flow, how can we guarantee that when a user is either on roaming and using a pay-as-you-go service (prepay) a service is triggered to monitor the call and bill it in real time according the visited network, terminating said call when there is not enough credit or the client is reaching a threshold value of the phone charges.

Nowadays, phone companies provide two feasible solutions to the above mentioned problem. The first solution they are currently using is to forbid, deny or hold back terminating services for prepay users of contract users with bill control services. The second solutions is slightly more complicated and requires the addition of a functionality or implementation in the last services executed in the IMSm, so every single call received by the client triggers a MAP AnyTimeInterrogation (ATI) operation against the client's HLR in order to obtain the MSC address (MSCAddress) and the cell identifier (CellId) where the client is allocated (both are quite relevant since there are maritime Networks which require a special Billings and share MSCs with terrestrial Networks, so the only way to identify said maritime Networks is by means of the Cell Identification when the service detects a MSC which might correspond to a hybrid network (mari-time/terrestrial). It's then possible, with said information, to establish a real-time dialogue with an online billing system (Online Charging System u OCS).

This second option implies sending up to four MAP operations, namely:

<AnyTimeInterrogation> (ATI), from the Server hosting the IMS application to the HLR.

<ProvideSubscriberInformation>, from the HLR to the VLR.

<ProvideSubscriberinformationAck>, from the VLR to the HLR

<AnyTimeInterrogationAck> from the HLR the Server hosting the IMS application, for roaming a non-roaming clients/UEs.

Taking into account that, currently, billing terminating calls are carried out only when the client is on roaming, and most of the time received calls use the home network, we are now using four MAP operations (which are needless, providing no added value to the voice call) for several voice calls which actually do not require such operations, thus unnecessarily overloading signalling networks.

Therefore, existing solutions either do not work properly or generate a lot of unnecessary traffic.

DESCRIPTION OF THE INVENTION

The method of the invention mainly consists of using an IP Multimedia Subsystem (IMS) application server which is triggered as the last IMS service for each call and performing at least one of the following operations:

Sending a Send Routing Information (SRI) MAP operation to the Home Location Register (HLR) of the user, so as to obtain a Mobile Station Roaming Number (MSRN) where to route the call.

Analysing the Mobile Station Roaming Number (MSRN) and, if this turns out to be foreign, sends an Any Time Interrogation Map (ATI-MAP) operation to obtain MSC and cell id where the user is. With this information it triggers the roaming charging process for the call (note that the cell id is needed since maritime and terrestrial roaming scenarios sometimes share Mobile Station Roaming Numbers (MSRNs) and Mobile Switching Centres (MSCs) and therefore can only be distinguished via the cell id; and it is necessary to distinguish between both because the roaming tariffs are different in each) and executes the <FreeDivertToVoiceMail> service.

Routes the call to the circuit network by prefixing the obtained Mobile Station Roaming Number (MSRN) so that when the MSC Server (MSS) in the circuit network receives the call, routes it to the operator owner of the Mobile Station Roaming Number (MSRN), if foreign, or to the MSC owner of the Mobile Station Roaming Number (MSRN), otherwise.

The application server stays in the IMS signalling path of the call, charging it properly and detecting any release caused by the <FreeDivertToVoiceMail> service.

Hence the method of the invention does actually reduce signalling loads since it only sends ATI operations when they are really needed, i.e., in roaming scenarios, covers the maritime roaming scenario and does not penalty the call set up time in national scenarios, since the Mobile Station Roaming Number (MSRN) obtaining process has to be done by the MSC anyway if the ITF does not provide it (i.e. no extra operation is sent).

In one embodiment of the invention the method proposed hereby poses a solution to the above mentioned problem by defining in the mobile client's profile or User Equipment (UE) profile in the Home Subscriber Server (HSS) a service named Intelligent Terminating Function (ITF), wherein said service is the last service to be invoked when the client receives a call (being the destination not modified by any possible previous service).

When the ITF receives an INVITE with a destination number, said ITF triggers a <SendRoutingInformation> MAP petition to the HLR of the referred number, acting as a MSS of a CS (Circuit Switch) network, including in said petition an indication of withdrawal of IN terminating services, then when the HLR receives said petition triggers a process for obtaining the MSRN of the client by establishing a communication with the VLR of the client (the VLR where client is allocated), namely a ProvideRoamingNumber operation; the VLR replies with an acknowledgement ProvideRoamingNumberAck which includes the MSRN. The HLR sends the MSRN to server of the application where the ITF is running as a part of the response to the SendRoutingInformation, the ITF analyses the MSRN received and performs some actions depending on the allocation network the client is allocated.

If the client is found to be in the client's home network, the client/UE is not on roaming, an INVITE is sent to the S-CSCF with the MSRN earlier obtained, eventually prefixed, as destination (Request URI), then the S-CSCF, eventually after consultation against a DNS-ENUM, routes said MSRN to the MSC.

When the client is found to be on roaming, determined to be in a foreign network, the ITF starts a MAP AnyTimeInterrogation operation against the HLR of the destination client. This will interact with the VLR (operations ProvideSubscriberInformation and its response). Then a MSC address is obtained along with a Cell Id of the camped client (camped on a cell of a foreign network, therefore on roaming); said information is attached to the AnyTimeInterrogation sent as response to the ITF. Then the ITF initialises a real time communication establishing a dialogue session with a billing system with the intention of determining whether the client has enough credit or billing privileges in order to establish the call; if as a result of this operation the ITF determines that the call may be established it sends an INVITE to de the S-CSCF with the MSRN obtained, eventually prefixed for numbering and country codes purposes, as destination (Request URI). After all of this, the call is managed as if the client is allocated inside the home network.

With this approach, by applying the method of the invention, the earlier mentioned four operations, are only used when the client is on roaming positively impacting on the need of using signalling load, hence optimizing the consumption of signalling load.

In an alternative embodiment of the invention when the client has activated an unconditional divert service, the response received might not be a MSRN but a ForwardedToNumber, then the ITF may:

Either send an INVITE to the S-CSCF with the ForwardedToNumber as destination along with information related to the divert service included as a part of the message (redirectingPartyNumber, redirecting counter, etc.). Likewise, the ITF must interact with the real-time billing system in order to bill the diverted call, or to ask the S-CSCF to interact with said real-time billing system.

Or send and INVITE to the S-CSCF with the ForwardedToNumber prefixed as destination, so the S-CSCF can refer it to a MSS of a CS network so said MSS can send the SendRoutingInformation to the HLR again, which will produce a call forwarding/divert in the MSS.

In a yet alternative embodiment it might also happen that the ITF does not trigger a real-time billing session with the billing system, but sends an INVITE to the S-CSCF instead. In said INVITE the ITF encloses the information related to the location of the user previously obtained (processed or not), and lets the S-CSCF to perform the real-time control of the call with the billing system.

In another embodiment of the invention the ITF may generate a call register CDR comprising information related to said call, such information may be gathered or collected by CDRs mediation system.

In yet another embodiment of the invention where the destination is on roaming the ITF may perform billing operations as well as the FreeDivertToVoiceMail service.

In a further embodiment when the ITF can be invoked from the CS Network with conventional IN protocols (e.g. CS1 or CAMEL), apart from the IMS network; then the ITF may be used for clients without terminating voice services receiving voice calls on roaming.

In a yet further embodiment the MSRN analysis does not only take into account the whether the user is in a foreign network, the method of the invention might selectively perform further operations depending on an specific network or specific foreign network; the method allows defining certain ranges of networks as well.

In an advantageous embodiment of the invention the ITF obtains the MSRN from the HLR by means of a SendRoutingInformation operation and the subsequent response, if the MSRN is determined to be belonging to the national network where the UE is located, the method would be carried out as described above; but if the MSRN is determined to be associated to a foreign network:

the ITF does not trigger the AnyTimeInterrogation but interacts with the real-time billing system to check whether the user/client has enough credit in order to establish a voice call to a foreign network, if the result of the query is positive, this means the client does actually have credit, the ITF sends an INVITE to the S-CSCF along with potentially prefixed MSRN as destination (Request-URI).

The call, same as happened in already described situation, may be forwarded to a CS network and, once there, it is routed to the destination client camped on the foreign network.

When the client answers the call, the ITF may intercept the response message and triggers the AnyTimeInterrogation message to the client obtaining the MSC address and the Cell Id as response.

The ITF may interact with the real-time billing system in order to check whether the client has enough credit for establishing a voice call to a specific network. In case the client has enough credit the ITF may authorize the response message to get to the central of origin so both sides can communicate.

This alternative ensures that the client, the subscriptor, has performed a paging action on the visited network, which assures the value of the Cell ID sent by the AnyTimeInterrogation operation, being said value updated to the current position of the client.

In all of the embodiments hereby described the AnyTimeInterrogation comprises an AgeOfLocation parameter, indicating time passed since the client's position in the cell was updated.

The method also encompass the possibility of establishing a time threshold value related to the AgeOfLocation, so when the value of said AgeOfLocation surpass the time threshold value the ITF obtains the MSRN from the HLR by means of a SendRoutingInformation operation and the subsequent response, if the MSRN is determined to be belonging to the national network where the UE is located, the method would be carried out as described above; but if the MSRN is determined to be associated to a foreign network:

the ITF does not trigger the AnyTimeInterrogation but interacts with the real-time billing system to check whether the user/client has enough credit in order to establish a voice call to a foreign network, if the result of the query is positive, this means the client does actually have credit, the ITF sends an INVITE to the S-CSCF along with potentially prefixed MSRN as destination (Request-URI).

The call, same as happened in already described situation, may be forwarded to a CS network and, once there, it is routed to the destination client camped on the foreign network.

When the client answers the call, the ITF may intercept the response message and triggers the AnyTimeInterrogation message to the client obtaining the MSC address and the Cell Id as response.

The ITF may interact with the real-time billing system in order to check whether the client has enough credit for establishing a voice call to a specific network. In case the client has enough credit the ITF may authorize the response message to get to the central of origin so both sides can communicate.

In one embodiment, the steps of (i) triggering a roaming charging process for the voice call; and (ii) executing a <FreeDivertToVoiceMail> service are additional steps which may be executed as alternative steps (i.e., either step is executed) or as combined steps (i.e., both are executed). The decision on whether to execute either additional steps (and in this case, which one of the two additional steps) or both additional steps may be based on an associated criterion. For example, this criterion may include some possible way of performing such decision, comprising:

configuration in the platform (e.g., same action for all users);

analysing (and deciding upon) some parameters coming in the initial request from the network to the node performing this action. E.g., in the IMS case it could be the 'Route' header of the incoming SIP INVITE message. In the IN case the ServiceKey coming in the INAP InitialDP message;

making the platform look up the destination number in a database (internal or external to the platform) and deciding upon other data associated to the destination number in a database.

DETAILED DESCRIPTION OF A PREFERRED EMBODIMENT

In a preferred embodiment of the invention a voice associated to a User Equipment (UE) is described, said User Equipment (UE) is a client of a wireless Communications network. So the flow of a normal operation of a voice service is:

the client dials a destination number establishing a voice call, using the UE, the voice call is managed by the ISUP reaching a MSS (MSC Server) that triggers a petition of MAP SendRoutingInformation to the HLR of the destination, namely a destination client, the HLR returns as response to the SendRoutingInformation a terminating mark of service of IN associated to said client, the MSS, according said mark, routes the call to an IMS network using an -INVITE-SIP message, an EI I-CSCF, first node of the IMS network consults the HSS and then routes the INVITE to the S-CSCF, after receiving the INVITE message, the S-CSCF downloads a user profile corresponding to the client from the HSS and triggers at least one service previously defined in said HSS (said triggering mainly consists of sending INIVITEs to one or more application servers defined in the user profile of the HSS, after executing a last service associated to the user profile, if the destination has not changed, said destination is amended by adding a prefix no the client number so the CSCF, after asking the ENUM, may send it to the Circuit Switch network, to a MSS, adding and indication saying that the call does not require terminating services.

after receiving the INVITE, the MSS, sends a MAP SendRoutingInformation petition to the destination client's HLR including a mark of withdrawal of terminating intelligent network services or mark of withdrawal of services, the HLR, once detected the mark of withdrawal of services, triggers a normal procedure of collection of a Mobile Station Roaming Number (MSRN), interacting with a VLR where the client UE is allocated and returning said MSRN to the calling MSS in the response to the SendRoutingInformation, The MSS routes the call to the MSRN La MSS using the usual procedures established by the ISUP/SS7.

The invention claimed is:

1. A method for terminating voice calls in a wireless communication network comprising an IP Multimedia Subsystem (IMS) application server allocated on a server comprising the following steps:

sending a Send Routing Information (SRI) MAP operation to a HLR (Home Location server) of a user/user equipment (UE) establishing a voice call to obtain a Mobile Station Roaming Number (MSRN);
analysing analyzing the MSRN;
determining whether the MSRN is related to a foreign network; and
performing the following operations when the MSRN is determined to be related to the foreign network;
    obtaining a Mobile Switching Center (MSC) address and a Cell ID of the user by sending an Any Time Interrogation Map (ATI-MAP);
    routing the voice call to a Circuit Switch (CS) network by prefixing the obtained MSRN;
    receiving the call in a MSC Server (MSS); and
    routing the call to an operator corresponding to the MSRN.

2. The method according to claim 1 wherein the foreign network is a wireless communication network different of a home network which the user is subscribed to.

3. The method according to claim 1 further comprising:
defining in a mobile client's profile or User Equipment (UE) profile in a Home Subscriber Server (HSS) an Intelligent Terminating Function (ITF) service, said ITF service being a last service to be invoked when the client receives a call;
requesting, by means of the ITF, a <SendRoutingInformation> MAP petition to an HLR (Home Location Register) of a referred number along with an indication of withdrawal of IN terminating services;
receiving the request in the HLR;
obtaining, by means of the HLR, a process for obtaining the MSRN of the client;
sending the MSRN as part of a response to the <SendRoutingInformation> to a server where the ITF is running;
analysing the MSRN received; and
determining an allocation network where the client is allocated.

4. The method according to claim 3 wherein the MSRN is obtained by establishing a communication with a Visitor Location Register (VLR) of the client.

5. The method according to claim 4 wherein the communication comprises:
sending a ProvideRoamingNumber petition operation to the VLR; and
responding to said operation, by means of the VLR, with a ProvideRoamingNumberAck that comprises the MSRN.

6. The method according to claim 1, wherein the operations further comprise performing either or both of the following additional steps:
triggering a roaming charging process for the voice call; and
executing a <FreeDivertToVoiceMail> service.

7. The method according to claim 6, wherein the performing either or both of the additional steps is based on an associated criterion.

* * * * *